Patented Jan. 15, 1952

2,582,940

UNITED STATES PATENT OFFICE 2,582,940

THIOSEMICARBAZIDE RODENTICIDE

Emanuel Waletzky, Stamford, Conn., and Alexander Bliznick, Long Island City, N. Y., assignors to American Cyanamid Company, New York, N. Y., a corporation of Maine No Drawing. Application July 5, 1947, Serial No. 759,290

1 Claim. (Cl. 167—46)

The present invention relates to a novel poison for the group of mammals known as Rodentia, and to methods of using the same.

It is known that organic compounds such as the N-aryl thioureas possess high rodenticidal activity. However, many of these compounds are limited in their application and unsuccessful as practical rodenticides. For example, it has been found that the taste of N-phenyl thiourea, a highly toxic compound, is so repellent to rats that they will not take it unless it is thoroughly disguised by admixture with their favorite foods. Also -naphthyl thiourea, a well-known poison for adult wild Norway rats, is considerably less effective against the immature wild Norway rat.

It has now been discovered that thiosemicarbazide is highly lethal to rodents and is an unusually effective rodenticide when mixed with edible carriers or incorporated in drinking water used by rodents.

Thiosemicarbazide represented by the formula

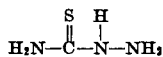

may be prepared by well-known methods, for example, by the reaction of hydrazine sulfate with ammonium thiocyanate. The compound, a crystalline material melting at 181°–183° C., is readily soluble in water, and would seem to have no taste or odor that is detectable by the rodent. Toxic doses in water are readily accepted by rodents and death occurs rapidly.

A 100% mortality occurred in 3 hours with laboratory rats which drank water containing 0.2% of thiosemicarbazide. Adult and immature wild Norway rats were also killed during an overnight period by drinking an 0.5% solution of thiosemicarbazide in tap water.

Immature wild Norway rats died during an overnight period while feeding on a poisoned bait consisting of two parts of thiosemicarbazide and 98 parts of cornmeal. A 100% mortality occurred during the same period wth adult wild Norway rats feeding on yellow cornmeal containing about 1% of thiosemicarbazide.

A single oral dose (administration by stomach tube) of 25 mg. of thiosemicarbazide per kg. of body weight gave a 100% kill of laboratory rats in 3 hours, while 1 g. per. kg. of body weight gave a 100% kill of laboratory mice in 2 hours.

A bait of rodent edible food containing about 2% by weight of thiosemicarbazide when fed to a group of laboratory white mice gave a 100% kill in less than 24 hours.

Administration of thiosemicarbazide in the drinking water of rodents is particularly advantageous in many places, for example, in the vicinity of grain storage where the supply of food for the rodent is plentiful and water is scarce. It may be employed in concentrations within the range of from 0.05% to 2% for the control of both the young and adult wild Norway rats.

Inasmuch as thiosemicarbazide does not have an objectionable odor or taste, it is particularly suited for incorporating in edible carriers for the rodents which do not appear to either detect the presence of the poison or do not object to it if they do detect it. The compound can be utilized in a variety of baits such as ground meat, ground wheat, corn and the like. It may be employed in dusts with diluents such as talc, diatomaceous earth, pyrophyllite, bentonite, etc., and utilized as a "tracking poison," that is to say, the rodent collects the dust on its feet and later licks them upon entering its nest.

While the invention has been described with particular reference to specific embodiments, it is to be understood that it is not to be limited thereto but is to be construed broadly and restricted solely by the scope of the appended claim.

We claim:

A rodenticide including as its principal toxic ingredient thiosemicarbazide, and a rodent edible solid food as a dispersion medium therefor.

EMANUEL WALETZKY.
ALEXANDER BLIZNICK.

REFERENCES CITED

The following references are of record in the file of this patent:

UNITED STATES PATENTS

| Number | Name | Date |
| --- | --- | --- |
| 1,858,177 | Aeschlimann | May 10, 1932 |
| 2,390,848 | Richter | Dec. 11, 1945 |

OTHER REFERENCES

Campbell et al., J. Econ. Entomology, vol. 27 (1934) pp. 1176–1185 (p.1180 relied upon).

Merck Index, Rahway N. J., 1940, 5th Ed., p. 553.